United States Patent [19]

Garney

[11] Patent Number: 5,636,202

[45] Date of Patent: Jun. 3, 1997

[54] TEST SYSTEM FOR DETECTING ISDN NT1-U INTERFACES

[75] Inventor: David J. Garney, Glen Ellyn, Ill.

[73] Assignee: Lucent Technologies Inc., Murray Hill, N.J.

[21] Appl. No.: 506,678

[22] Filed: Jul. 25, 1995

[51] Int. Cl.⁶ .................................................. H04B 10/08
[52] U.S. Cl. ............................ 370/241; 379/29; 370/524
[58] Field of Search ................................. 370/13, 14, 15, 370/110.1; 379/1, 2, 5, 22, 24, 25, 26, 27, 29, 30, 34; 395/182.02

[56] References Cited

U.S. PATENT DOCUMENTS

| | | | |
|---|---|---|---|
| 4,592,048 | 5/1986 | Beckner et al. | 370/60 |
| 4,870,675 | 9/1989 | Fuller et al. | 379/26 |
| 5,054,050 | 10/1991 | Burke et al. | 379/27 |
| 5,208,846 | 5/1993 | Hammond et al. | 379/29 |
| 5,301,050 | 4/1994 | Czerwiec et al. | 379/29 |
| 5,440,610 | 8/1995 | Schillaci et al. | 379/24 |
| 5,444,759 | 8/1995 | Vogt, III et al. | 379/24 |
| 5,528,679 | 6/1996 | Taarud | 379/34 |

OTHER PUBLICATIONS

M. E. Burke et al., "Channel and Drop Testing in the SLC(R) Series 5 Carrier Fiber-To-The-Home Feature", National Fiber Optics Engineers Conference, Apr. 4, 1991, pp. 1-7 & Figs. 1-5.

SLC(R) Series 5 Carriet System, AUA411 Channel and Drop Test Unit—5SPQAA3, AT&T Data Sheet, AT&T 363-005-275, Issue 2, Mar. 1994, pp. 1-4.

*Primary Examiner*—Alpus H. Hsu
*Assistant Examiner*—Seema S. Rao
*Attorney, Agent, or Firm*—Dennis J. Williamson

[57] ABSTRACT

The invention is a test method for testing ISDN interfaces from a remote location. The test method of the invention applies predetermined energy signals to the tip and ring leads of the customer subscriber line in a prescribed sequence, delays 10 to 100 ms, and then makes measurements of the voltage across the tip and ring leads. The voltage measurements are compared to limit values identified from the NT1-U dc characteristic curve to determine pass/fail of the tested interface.

19 Claims, 3 Drawing Sheets

TEST SYSTEM FOR DETECTING ISDN NT1-U INTERFACES

BACKGROUND OF THE INVENTION

The invention relates, generally, to a system for testing for ISDN NT1-U interfaces in which energy is applied to the interface and voltage measurements are taken across the interface at predetermined times corresponding to points on the NT1-U dc characteristic curve.

It will be appreciated that telecommunication service providers must efficiently service and maintain the network in order to provide reliable, high quality service. One of the difficulties faced by the service providers is in identifying the source of a problem in response to a customer's complaint. As a result, numerous test systems have been developed for testing the operability of various components in the network to determine if the problem resides in the customer premise equipment (CPE), in the line drop connecting the CPE to the switching system or elsewhere in the system. As will be appreciated, the source of the problem dictates who is responsible for its repair and how the repair is made. By quickly and economically identifying the source of problem, resources can be more efficiently allocated.

To explain the environment in which such testing systems operate, the arrangement of a typical switching system will be briefly described. A typical switching system, illustrated in FIG. 1, includes a central office 2 consisting of a switch such as the 5ESS switch manufactured by AT&T and described in U.S. Pat. No. 4,592,048 issued to Beckner et al. on May 27, 1986. The central office 2 is connected directly to a large number of CPE's 4 over subscriber lines 6 and is connected to other switches in the public switched telephone network 8 via trunks 10 such that calls can be muted between CPEs 4 and other CPEs in network 8 as is well known. The central office 2 includes processing and switching capabilities for routing calls through the network, performing administrative and billing functions, providing special services such as conference calling, call forwarding or the like, and for running peripheral equipment. A central office is a large, sophisticated piece of equipment capable of hosting tens of thousands of subscriber lines.

Each of the subscriber lines 6 is constructed of a pair of relatively expensive copper wires having a usable range of approximately five miles. Beyond this distance, the signal quality degrades. To limit the length of the subscriber lines and to minimize the number of subscriber lines emanating from the central office, a relatively small and simple remote terminal 12 has been developed. One example of such remote terminals is the SLC family of terminals manufactured by AT&T and capable of hosting 2,000 subscriber lines 14 that serve CPEs 16. These remote terminals are typically located two to five miles from the central office 2 and are connected to the central office by a fiber optic cable 18, although the distance from the central office can vary. Such remote terminals include processors capable of performing call routing functions but not providing the administrative functions of a central office.

The advantage of such remote terminals is that telephony service can be provided in rapidly growing areas or in remote areas quickly and inexpensively by periodically adding remote terminals to an existing central office. Because a single fiber optic cable 18 connects the central office 2 to the remote switch 12, it is not necessary to run expensive copper wire from the central office to each CPE 16. As a result, the cost of extending service to new areas is lower. Moreover, there is very little signal degradation over the fiber optic cable.

There have also been developed even smaller remote terminals 22 such as the Multi-Services Distant Terminal (MSDT) manufactured by AT&T. These small remote terminals 22 are typically connected to one of the SLC family of terminals or other larger remote terminal 12 by a fiber optic cable 24. The MSDT can host approximately 20–30 CPEs 26 via copper subscriber lines 28. These small remote terminals are typically used to provide telephony services to the most distant and lightly populated areas such as in particular a remotely located building.

To test for problems in the system, many central offices 2 are provided with (or can be connected to) a local line test unit 3 that can be selectively connected to one of the lines 6 through the test access switch 7 for testing the customer service lines 6 and CPEs 4 directly from the central office. It is also known in the art to provide centralized test unit facilities 9 remote from the central offices that access a plurality of central offices via wire or fiber 11 to test subscriber lines and CPE's served by those central offices. Such test facilities, while providing sophisticated test capabilities, are relatively expensive such that their use is justified only for large switches, such as central offices, that host a large number of customer service lines.

Many of the larger remote terminals 12 include integrated test units 13 for testing the subscriber lines 14 and CPEs 16 connected to those terminals. These test units are less expensive than either the local or centralized test unit equipment associated with the central offices such that their use is economically justified for the fewer subscriber lines served by the remote terminals, although these test units do not have all of the test capabilities of the more expensive test systems. Typically, the test units 13 in the remote terminals are controlled by the central office 2, either independently or in concert with the centralized test unit 9, and perform tests based on requests from the central office. The test units communicate with the central office either over fiber optic cable 18 or over a twisted wire pair 28 provided specifically for transmitting test signals.

Finally, it is known to provide a channel and drop test unit (CDTU) 21 that includes a simple test circuit in the small remote terminals (such as the MSDT) 22 that can determine if an analog telephone is connected to the subscriber line and is operating. One such test circuit is the AUA411 manufactured and sold by AT&T for use in the MSDT remote terminal and described in detail in U.S. Pat. No. 5,054,050 issued to Burke, et al. on Oct. 1, 1991. While the described circuit is relatively inexpensive, it has been used only to perform a method for testing for analog service.

It will be appreciated that in addition to analog service, many businesses and homes now receive ISDN services. ISDN customer premise equipment (CPE) communicate with ISDN switching systems in two 64 kilobits per second (Kbps) B-channels and in one 16 Kbps D-channel. Each of the B-channels is usable to convey digitized voice samples at the rate of 8,000 8-bit samples per second and data at the rate of 64 Kbps. The D-channel is used both to convey signaling packets to effect message signaling between ISDN stations and switches or other ISDN stations and to convey data packets among ISDN stations. ISDN provides end-to-end digital connectivity to transmit voice, audio, visual and data information through user-network interfaces. The interface for transmission between ISDN CPEs and an ISDN switching system is a digital subscriber line. One common interface is the NT1-U interface which provides ISDN service using a two-wire digital subscriber line.

The operating specifications for the NT1-U interface are defined in the NT1-U dc characteristic curve put forth by the American National Standards Institute (ANSI) in the ANSI, T1.601-1992 standards. The testing criteria for the NT1-U is also defined by ANSI and Bellcore for the ISDN NT1-U dc characteristic which suggest measuring current flow for determining the presence of an ISDN NT1-U interface. The existing test circuitry used in the small remote terminals, for example AT&T's AUA411 circuitry, does not measure current flow. Rather, it measures voltages across the interface to detect analog service. Thus, it is not readily apparent that this circuitry is compatible with the suggested current flow test procedure set forth by ANSI. Moreover, existing ISDN interface tests, such as that used in either the local or centralized line test units, are too expensive for their use to be justified with the 20–30 lines served by the small remote terminals.

Thus, a problem in the art exists in that a simple, cost effective method for testing ISDN interfaces by measuring voltages across the interface has not been developed.

SUMMARY OF THE INVENTION

The invention solves the above-noted problem by developing a test method that applies predetermined energy signals to the tip and ring leads of the customer subscriber line in a prescribed sequence, delays 10 to 100 ms, and then makes measurements of the voltage across the tip and ring leads. The voltage measurements are compared to limit values identified from the NT1-U dc characteristic curve to determine pass/fail of the tested interface. In a preferred embodiment, the test method of the invention uses the existing analog test circuitry on AT&T's AUA411 test unit to generate the energy signals that are applied to the tip and ring leads to test for ISDN interfaces.

DETAILED DESCRIPTION

Figure 2:
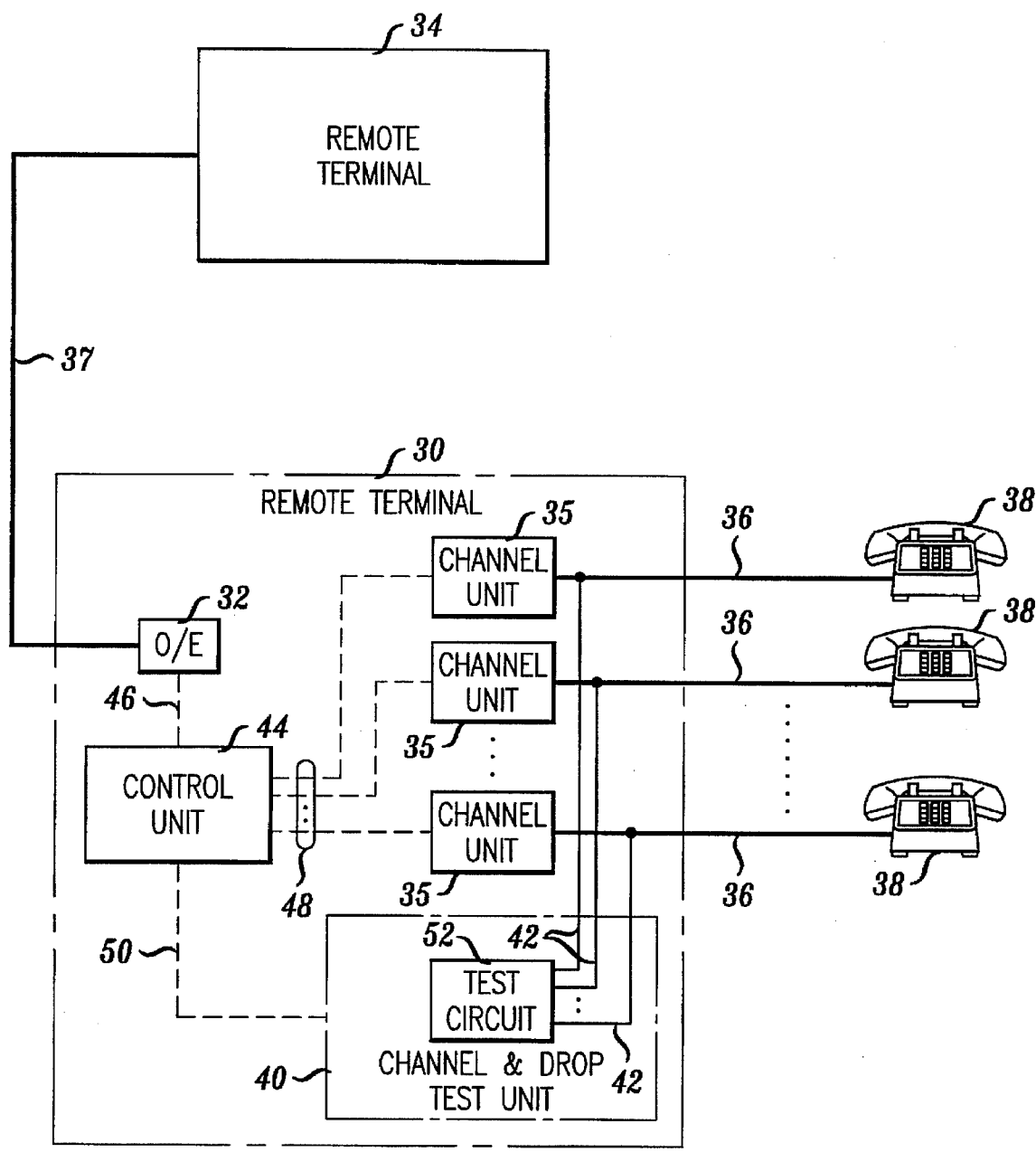
FIG. 2 is a block diagram showing the test system for performing the method of invention.

Referring more specifically to FIG. 2, a block diagram of a small remote terminal 30 shows one typical prior art configuration of the testing system used to test the line drop. The illustrated testing system consists of an optical/electrical interface 32 that interfaces between the fiber optic cable 37 that connects a switch 35 such as a central office (or remote terminal such as a SLC-2000) to the internal electronics of the remote terminal 30. Channel units 34 interface with customer subscriber lines 36 that terminate at customer premises equipment 38 such as ISDN telephone sets, terminals, multimedia equipment or the like. It will be appreciated that if remote switch 30 is an AT&T MSDT or comparable switch, approximately 20–30 subscriber lines 36 can be hosted. A channel and drop test unit (CDTU) 40 is connected to each of the subscriber lines via lines 42. CDTU 40 includes the test circuit 52 for performing the ISDN test method of the invention as well as the electronics for performing additional tests such as tests for analog service or the like. A control unit 44 consisting of a processor and memory (not shown) communicates with interface 32, channel units 34 and CDTU 40 over data links 46, 48, and 50, respectively. In operation, the control unit 44, upon receipt of control signals from switch 35 via cable 37 and interface 32, controls channel units 34 to establish connections between CPEs 38 and switch 35. Likewise, control unit 44 instructs CDTU 40 to perform tests on subscriber lines 36 and CPEs 38, and reports the results of those tests to the central office.

Figure 1:
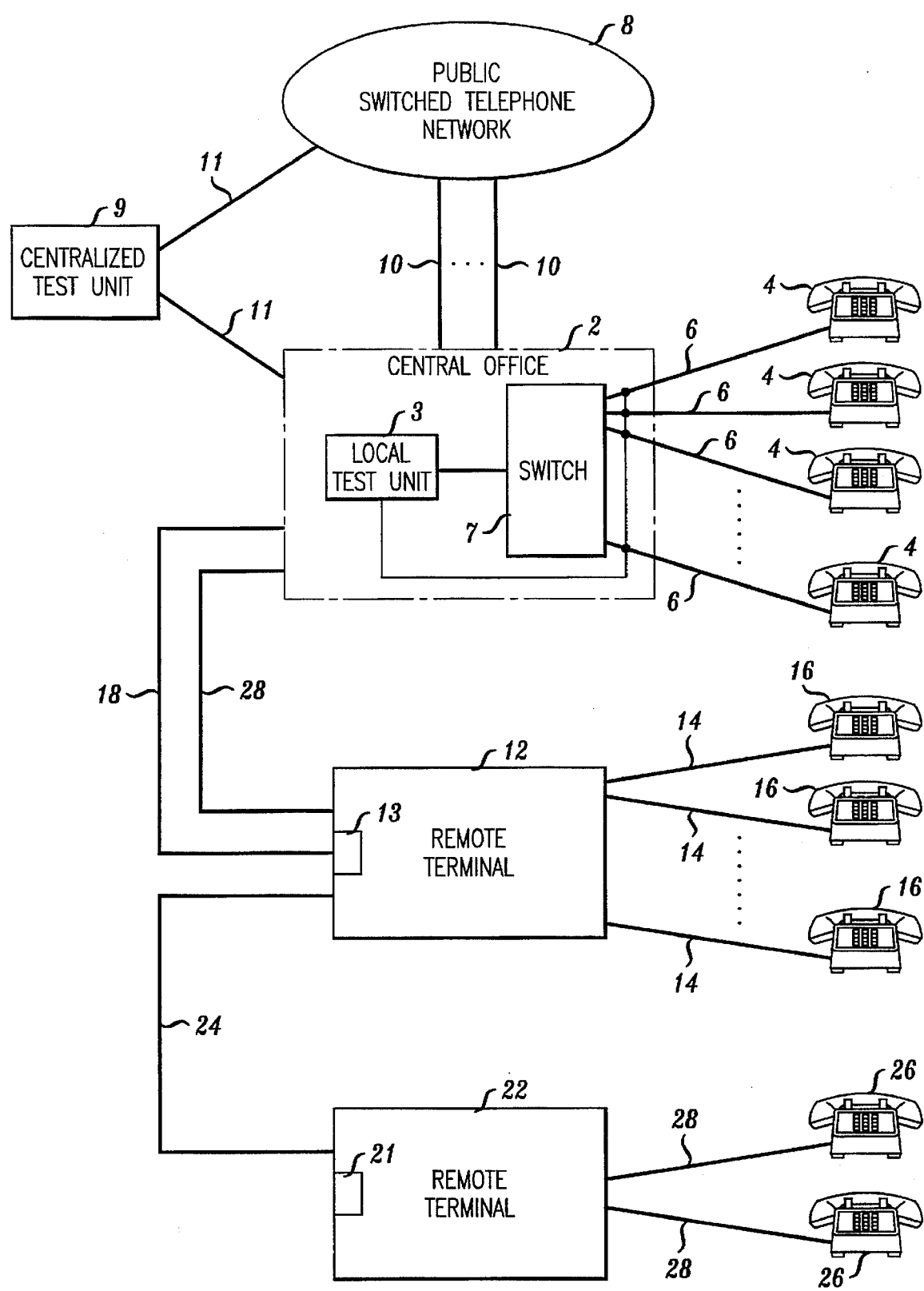
FIG. 1 is a block diagram showing a typical prior art switching system in which the test method of the invention is used.

Line tests are made when a central office initiates a testing sequence in the signaling bits addressed to the control unit 44 over line 37 informing the control unit that it is under test. The testing sequence is normally initiated at a central office 2 or by the centralized test unit 9 (described with reference to FIG. 1) either in response to a reported problem in service or as part of a normal maintenance pattern. Upon receipt of the test signals, the control unit 44 activates the appropriate test system in the CDTU 40 and the CDTU proceeds with its sequence of drop tests. The CDTU 40 reports the results of the drop tests to the control unit 44 and the control unit transmits these results to the central office that made the initial test request. The central office recognizes the test results and displays the results to an operator identifying the tested line and the test results. Based on these results the operator makes an appropriate repair/maintenance decision. While the architecture and operation of the remote switch has been described with specific reference to the AT&T MSDT, it will be appreciated that the test method of the invention can be used with any switching system or remote terminal.

The CDTU 40 includes test circuit 52 for automatically applying energy of a predetermined magnitude and in a predetermined sequence to the line drop and for measuring the voltage across the drop resulting from the application of energy in accordance with the method of the invention. A suitable test circuit for applying the desired energy to the drop is disclosed in U.S. Pat. No. 5,054,050 issued to Burke, et al., the disclosure of which is incorporated herein by reference, and is commercially available as the AUA411 Channel and Drop Test Unit manufactured and sold by AT&T. The AUA411 is currently used to perform a drop test for analog service. In the disclosed circuit, firmware controls the source signals that are applied to the drop by manipulating switches via a programmable control latch chip as will be appreciated by one skilled in the art. It will be appreciated that the disclosed circuit is capable of applying a variety of energys in a variety of sequences and that the method of the invention applies a unique sequence of energies to the drop to identify the NT1-U interface. While a preferred circuit has been disclosed it will be appreciated that any circuit capable of producing source signals of an amplitude and duration as set forth below and of making the desired voltage measurements can be used.

The ISDN dc signature test method of the invention is based on the ANSI T1.601-1922 standards for NT1-U interfaces and research and testing conducted by the inventor on commercially available NT1-U interfaces. Generally, the method of the invention applies energy to the tip and ring leads (i.e., the termination of the two copper wires that constitute a subscriber line that connects to the CPE) and measures the resultant voltage at three points on the ANSI NT1-U dc characteristic curve. Specifically, the voltage is measured at a point of the OFF state, a point of the ON state and a point of the return to OFF state. While the analog test method also uses the AUA411 test circuit to apply energy to the tip and ring leads, the operating characteristics for the NT1-U interface are completely different than the operating characteristics of an analog telephone. Thus, the analog test method performed by the AUA411 is not capable of being used to test for ISDN interfaces. The ISDN test method of the invention is specifically designed to test for the NT1-U interface with the benefit of being capable of being performed using existing circuitry. The method of the invention not only conforms to TR-909 specifications requiring the testing of an NT1-U at two points on the characteristic curve but also determines if there is an open circuit, a resistive fault or a miswired pair connected to an analog telephone.

As will be appreciated, the ANSI NT1-U dc signature characteristic curve changes between the ON and OFF states of the CPE. Specifically, when the CPE is in the OFF state, an applied current of up to 1 ma will cause the voltage across the NT1-U interface to measure at least 30 volts. When the CPE is in the ON state, however, the voltage across the NT1-U interface must measure less than 20 volts for the same applied current. Thus, by measuring the differences in voltage across the tip and ring leads for the same applied energy (i.e. using a delta voltage technique) as opposed to existing ISDN or analog delta current tests, a delta voltage of 10 volts or greater can be detected between the OFF and ON states for the same source energy. It will be appreciated that this voltage difference could be translatable to currents using different circuitry and measuring techniques.

Figure 3:
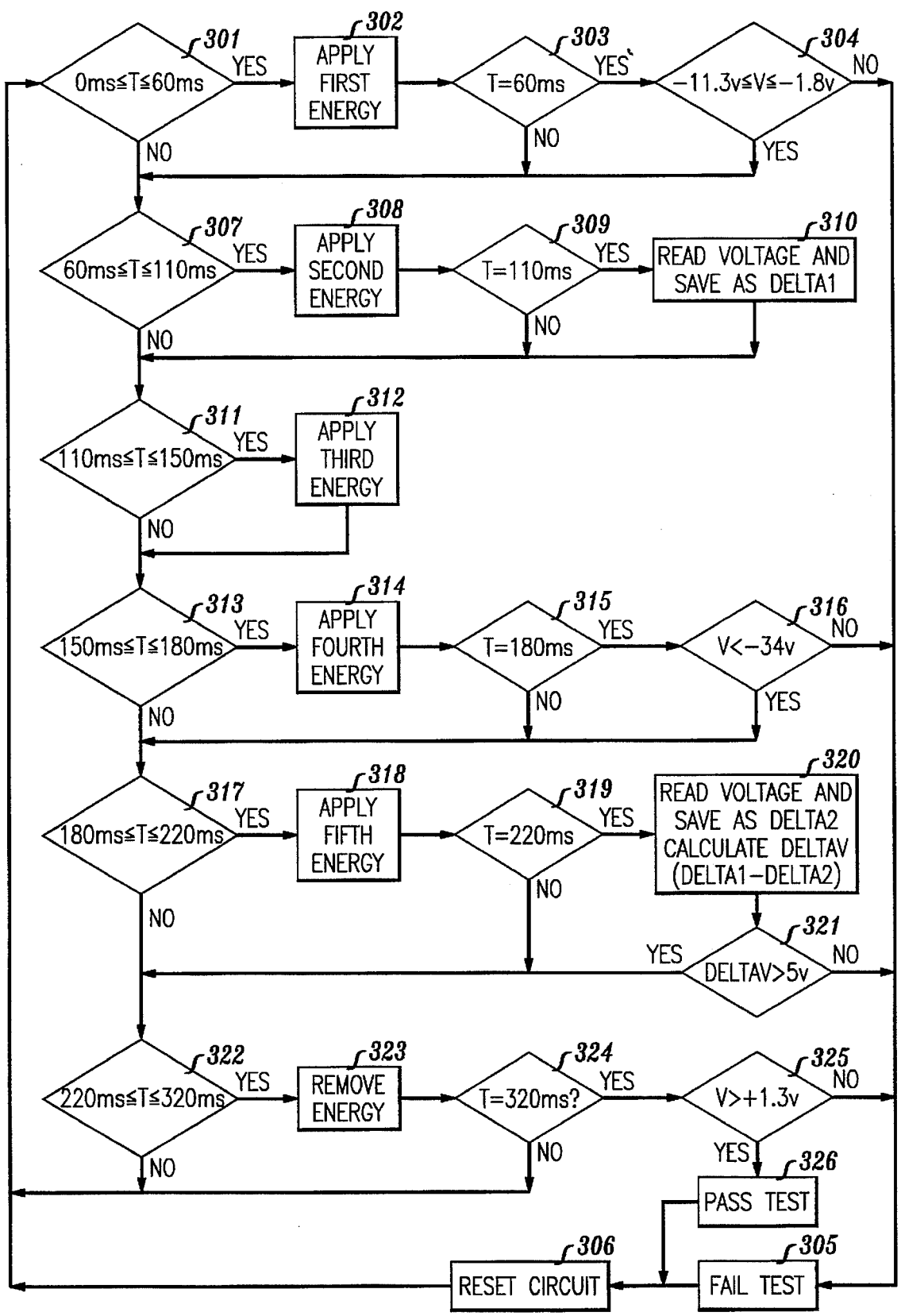
FIG. 3 is a flow chart illustrating the method of the invention.

The method of the invention will be described in detail with reference to the flow diagram of FIG. 3. Upon receipt of signaling from the central office requesting that an ISDN drop test is to be conducted on a specified drop, the CDTU or similar controller activates the test circuit to initiate the test method of the invention. Referring to FIG. 3, at time zero, the test program is initiated and a first decision is made (block 301) as to whether the total test time (T) is less than or equal to 60 ms. For the first 60 milliseconds (ms) of the test, a relatively small first energy is applied to the drop (block 302). It has been determined that an open circuit energy between approximately −9 to −13 volts may be applied and that preferably an energy of −11 volts is applied to the drop. The disclosed circuit cycles through the entire method illustrated in FIG. 3 every 10 ms such that every 10 ms decisions are made based on the elapsed total test time. Thus, every 10 ms, decision is made as to whether 60 ms have elapsed (block 303). If 60 ms have not elapsed, the voltage applied to the drop is maintained. After 60 ms have elapsed, a measurement is taken to determine the voltage across the drop (block 304). If the voltage across the drop is not between approximately −1.8 volts and −11.3 volts, the tested interface is not a standard NT1-U interface. Such an interface may be a tip-ring resistive cross, an analog telephone or an open tip and ring but it is not an NT1-U interface and the drop fails the test for the ISDN interface. The control unit 44 is informed of the failed test (block 305) and the timer is reset to zero and all relays are idled to place the circuit in a condition to re-perform the test (block 306). The control unit 44 relays the test results to the central office or MLT that requested the test such that appropriate action may be taken. Importantly, the method of the invention identifies a failure in the first 60 ms of the test, such that conditions other than a NT1-U interface can be quickly identified.

If the measured voltage across the drop is between −1.8 volts and −11.3 volts (block 304) an NT1-U interface may be present and the test is continued to confirm the existence of the NT1-U interface. Specifically, a decision is made as to whether the total test time (T) is greater than or equal to 60 ms but less than or equal to 110 ms (block 307). If the total test time is within this range, a second energy of between approximately −28 and −36 volts may be applied to the drop and that preferably an energy of −32 volts is applied (block 308). This energy is sufficient to create a resultant voltage across the NT1-U interface but not large enough to turn the interface to the ON state. The second energy is applied until the total test time (T) is 110 ms (block 309) at which time a second voltage measurement is taken across the drop. The second voltage measurement is stored in memory as delta1 (block 310).

When the total test time (T) equals or exceeds 110 ms, but is less than 150 ms, (block 311) a relatively large third energy is applied to the drop sufficient to turn an ISDN NT1-U interface ON (block 312). Specifically, an energy of between −54 and −66 volts may be applied and that preferably a voltage of −60 V is applied. A decision is then made every 10 ms as to whether the total test time has reached 150 ms (block 311). If the total test time is less than 150 ms the circuit cycles through the illustrated method maintaining the −60 V.

When the total test time (T) equals or exceeds 150 ms, but is less than 180 ms (block 313) a smaller fourth energy is applied that is sufficient to maintain the NT1-U interface ON (block 314). Specifically, a voltage of between −30 and −38 volts and preferably −34 volts is applied. At a total test time of 180 ms (block 315) a measurement is taken of the voltage across the interface (block 316). If the measured voltage is less than approximately −34 volts, the interface fails the test and the interface is possibly an analog telephone or an open tip and ring. The test failure is reported to the control unit 44 (block 305) and the test circuit is reset (block 306). Again, the control unit 44 relays the test result to the central office or MLT making the test request. If the measured voltage is greater than −34 volts, a NT1-U interfaces is possibly present and the test is continued.

A decision is then made as to whether the total test time (T) is between 180 ms and 220 ms (block 317). If the total time is not within this range the test method cycles through the remaining steps. If the total test time is within this range, a relatively lower fifth energy is applied in order to attempt to maintain the ISDN CPE "ON" (block 318). An energy of between −30 and −36 volts may be applied and preferably an energy of −32 volts is applied to the drop. Preferably, the fifth energy is the same as the second energy. The fifth energy is maintained until the total test time equals 220 ms (block 319). At the 220 ms total test time, a measurement is taken of the voltage across the interface (block 320). The measured voltage is designated delta2. Delta2 is then subtracted from delta1 to derive a deltaV voltage where deltaV represents the voltage differential across the interface between the OFF and ON states of an ISDN NT1-U interface when the same energy level is applied (block 320). If deltaV is not greater than 5 volts, the interface is not an NT1-U and the test fails (block 321). The results are provided to the control unit 44 (block 305) and the test circuit is reset (block 306). If the DeltaV is greater than 5 volts (block 321), the test is continued.

A decision is then made as to whether the total test time (T) is between 220 ms and 320 ms (block 322). When the total test time reaches 220 ms, the NT1-U interface is inactivated by removing energy from the interface (block 323). At the 320 ms total test time (block 324) a measurement is taken of the voltage across the interface (block 325). If the measured voltage is greater than 1.3 volts, the interface fails the test, the failure is reported to the control unit 44 (block 305) and the test circuit is reset (block 306). If the measured voltage is less that 1.3 volts, the interface passes the test, the controller is informed of the pass result (block 326) and the test circuit is reset (block 306).

While the method of the invention has been described with reference to a particular test circuit for use in a remote terminal, it will be appreciated that any circuit capable of applying the desired energies to the interface may be used. It will also be appreciated that the method of the invention can be used to replace existing ISDN delta current tests in any switch system or terminal. It is to be understood that the above description is only of one preferred embodiment of the invention. Specifically, the method illustrated in FIG. 3 detects the ISDN NT1-U interface with a high degree of accuracy and reliability. It will be understood, however, that certain of the illustrated steps, while used to ensure the accuracy of the test, are not absolutely required to detect the ISDN NT1-U interface. For example, the steps of applying the first energy, applying the third energy, and removing the energy could be eliminated and the ISDN NT1-U interface could still be detected with some degree of certainty. To ensure the highest degree of accuracy and to conform with industry test standards, the implementation of all of the illustrated steps is preferred. Moreover, it will be appreciated that if the time periods during which the various energys are applied are made longer or shorter, the resulting measured voltages will vary slightly in accordance with the NT1-U characteristic curve. Numerous other arrangements may be devised by one skilled in the art without departing from the scope of the invention. The invention is thus limited only as defined in the accompanying claims.

The invention claimed is:

1. A method for testing for an ISDN NT1-U interface connected to a telecommunications network by a subscriber line, comprising the steps of:
   a) applying a first energy to the interface over said subscriber line and determining if a first voltage across the interface is within a first predetermined range, said first predetermined range being within a first characteristic range of voltages defining an off state for said interface;
   b) if the first voltage is within the first predetermined range, applying a second energy to the interface over said subscriber line and determining a second voltage across the interface, said second energy being within said first characteristic range;
   c) applying a third energy to the interface over the subscriber line, said third energy being sufficient to turn the interface on;
   d) applying a fourth energy to the interface over said subscriber line, and determining if a third voltage across the interface is within a second predetermined range, said second predetermined range being within a second characteristic range of voltages defining an on state for said interface;
   e) if the voltage is within the second predetermined range, applying a fifth energy to the interface over said subscriber line, said fifth energy being substantially equal to said second energy, and determining a fourth voltage across the interface, said fourth voltage being within said second characteristic range of voltages; and
   f) determining the difference between the second voltage and the fourth voltage, and determining if the difference is within a third predetermined range whereby the interface can be identified as an ISDN standard interface.

2. The method of claim 1, further including the steps of removing all energy from the interface and determining if a fifth voltage across the interface is within a fourth predetermined range.

3. The method of claim 2, wherein the step of determining a fifth voltage includes the step of measuring the voltage at a fifth predetermined time after all energy is removed.

4. The method of claim 3, wherein the fifth predetermined time is 100 ms.

5. The method of claim 1, wherein the first energy is between −9 and −13 volts.

6. The method of claim 1, wherein the second energy is between −30 and −36 volts.

7. The method of claim 1 wherein the third energy is between −54 and −66 volts.

8. The method of claim 1, wherein the fourth energy is between −30 and −38 volts.

9. The method of claim 1, wherein the step of determining the first voltage includes the step of measuring the voltage at a first predetermined time after the first energy is applied.

10. The method of claim 9, wherein the first predetermined time is 60 ms.

11. The method of claim 1, wherein the step of determining a second voltage includes the step of measuring the voltage at a second predetermined time after the second energy is applied.

12. The method of claim 11, wherein the second predetermined time is 50 ms.

13. The method of claim 1, wherein the step of determining the third voltage includes the step of measuring the voltage at a third predetermined time after the fourth energy is applied.

14. The method of claim 13, whereby the third predetermined time is 30 ms.

15. The method of claim 1, wherein the step of determining the fourth voltage includes the step of measuring the voltage at a fourth predetermined time after the fifth energy is applied.

16. The method of claim 15, wherein the fourth predetermined time is 40 ms.

17. A method for testing for an ISDN NT1-U interface, comprising the steps of:
   a) applying a first energy to the interface and determining if a first voltage across the interface is within a first predetermined range;
   b) if the first voltage is not within the first predetermined range, reporting a failure condition;
   c) if the first voltage is within the first predetermined range, applying a second energy to the interface and measuring a second voltage across the interface;
   d) applying a third energy sufficient to turn the interface on;
   e) applying a fourth energy to the interface and determining if a third voltage across the interface is within a second predetermined range;
   f) if the third voltage is not within the second predetermined range, reporting a failure condition;
   g) if the third voltage is within the second predetermined range, applying a fifth energy to the interface, and determining a fourth voltage across the interface;
   h) determining the difference between the second voltage and the fourth voltage, and determining if the difference is within a third predetermined range;
   i) removing all energy from the interface and determining if a fifth voltage across the interface is within a fourth predetermined range; and
   j) if the fifth voltage is within the fourth predetermined range, reporting a pass condition.

18. The method of claim 17, wherein said fourth energy is substantially the same as said second energy.

19. A method for testing for an ISDN NT1-U interface connected to a telecommunications network by a subscriber line, comprising the steps of:

a) applying a first energy to the interface over said subscriber line and determining a first voltage across the interface, said first energy being within a first characteristic range of voltages defining an off state for the interface;

b) applying a second energy to the interface over the subscriber line, said second energy being sufficient to turn the interface on;

c) applying a third energy to the interface over said subscriber line, said third energy being substantially equal to said first energy, and determining a second voltage across the interface, said second voltage being within a second characteristic range of voltages defining an on state for said interface; and d) determining the difference between the first voltage and the second voltage, and determining if the difference is within a third predetermined range whereby the interface can be identified as an ISDN standard interface.

* * * * *